United States Patent
Wolsiefer et al.

(10) Patent No.: US 9,050,643 B2
(45) Date of Patent: Jun. 9, 2015

(54) METHOD FOR CONNECTING TWO COMPONENTS OF A VEHICLE SEAT

(75) Inventors: Harald Wolsiefer, Krickenbach (DE); Ramon Loos, Glanbrücken (DE); Rainer Schollenberg, Kaiserslautern (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 37 days.

(21) Appl. No.: 13/995,923

(22) PCT Filed: Nov. 25, 2011

(86) PCT No.: PCT/EP2011/005932
§ 371 (c)(1), (2), (4) Date: Aug. 1, 2013

(87) PCT Pub. No.: WO2012/084117
PCT Pub. Date: Jun. 28, 2012

(65) Prior Publication Data
US 2013/0334857 A1    Dec. 19, 2013

(30) Foreign Application Priority Data
Dec. 20, 2010 (DE) .......................... 10 2010 056 378

(51) Int. Cl.
*B60N 2/00* (2006.01)
*B21D 26/14* (2006.01)
(Continued)

(52) U.S. Cl.
CPC .......... *B21D 26/14* (2013.01); *Y10T 29/49826* (2015.01); *B21D 39/03* (2013.01);
(Continued)

(58) Field of Classification Search
CPC .......... B21D 26/14; B21D 53/88; B60N 2/20; B60N 2/22; B60N 2/682; B23K 20/06
USPC ........................ 297/354.1, 354.12, 361.1, 366
See application file for complete search history.

(56) References Cited

U.S. PATENT DOCUMENTS 6,104,012 A * 8/2000 Durand ........................ 219/617
6,493,920 B1 * 12/2002 Hill et al. ........................ 29/469
(Continued)

FOREIGN PATENT DOCUMENTS

DE    44 36 101 A1    6/1995
DE    696 34 343 T2    6/2005
(Continued)

OTHER PUBLICATIONS

Notification of Transmittal of Translation of the International Preliminary Report on Patentability mailed Jul. 4, 2013 as received in corresponding International Application No. PCT/EP2011/005932 (7 pages).
(Continued)

*Primary Examiner* — Philip Gabler
(74) *Attorney, Agent, or Firm* — Foley & Lardner LLP

(57) ABSTRACT

In a method for connecting two at least partly metal components of a vehicle seat, which has a backrest that can be pivoted about an axis, wherein the two components are arranged relative to each other and are then connected, the two components are arranged at a distance from each other, at least in some regions, and connected by electromagnetic pulse technology. By a current pulse, electromagnetic fields are induced in the two components, the intense magnetic attraction force of which presses the two components together, producing an integral connection.

14 Claims, 12 Drawing Sheets

Figure 1E:
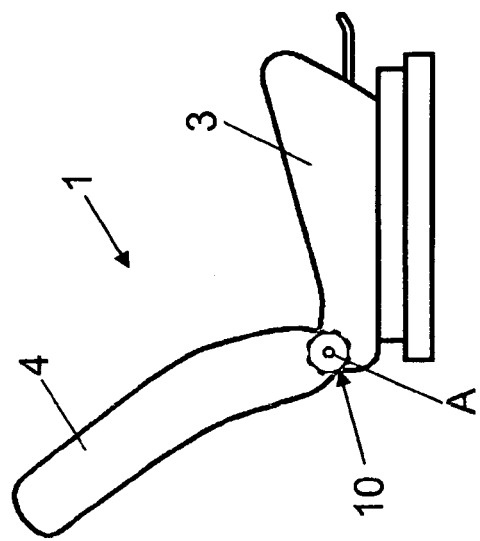

(51) Int. Cl.
  *B21D 39/03* (2006.01)
  *B21D 53/88* (2006.01)
  *B23K 20/06* (2006.01)
  *B60N 2/22* (2006.01)
  *B60N 2/68* (2006.01)
  *B60N 2/20* (2006.01)

(52) U.S. Cl.
  CPC .............. *B21D 53/88* (2013.01); *B23K 20/06* (2013.01); *B23K 2203/20* (2013.01); *B60N 2/22* (2013.01); *B60N 2/682* (2013.01); *B60N 2/20* (2013.01)

(56) References Cited

U.S. PATENT DOCUMENTS

| | | | |
|---|---|---|---|
| 6,908,024 | B2 | 6/2005 | Martin et al. |
| 7,093,901 | B2 * | 8/2006 | Yamada .................. 297/367 R |
| 7,199,333 | B2 | 4/2007 | Alphandary |
| 7,246,845 | B2 * | 7/2007 | Rashidy et al. .......... 296/187.12 |
| 7,963,591 | B2 | 6/2011 | Duguet et al. |
| 2009/0050676 | A1 | 2/2009 | Criqui |

FOREIGN PATENT DOCUMENTS

| | | |
|---|---|---|
| DE | 10 2006 015 560 B3 | 8/2007 |
| DE | 20 2009 017 811 U1 | 7/2010 |
| DE | 10 2009 019 320 A1 | 11/2010 |
| DE | 20 2010 015 143 U1 | 5/2011 |
| JP | 2006-014999 | 1/2006 |
| JP | 2006-088172 | 4/2006 |
| JP | 2008-067724 | 3/2008 |
| JP | 2008-520356 A | 6/2008 |
| JP | 2008-534284 A | 8/2008 |
| JP | 2009-501112 A | 1/2009 |
| JP | 2013-504475 A | 2/2013 |
| WO | WO-2009/056294 A1 | 5/2009 |
| WO | WO-2011/032691 A1 | 3/2011 |

OTHER PUBLICATIONS

International Search Report in PCT/EP2011/005932 dated Mar. 2, 2012.
Article entitled "Permanent Joint" The Great Soviet Encyclopedia—http://encyclopedia2.thefreedictionary.com/Permanent Joint.
Office Action dated Oct. 15, 2014, in corresponding Japanese Application No. 2013-542397,3 pages.
Office Action in corresponding Japanese Application No. 2013-542397 dated Jun. 17, 2014, and English translation, 11 pages.

* cited by examiner

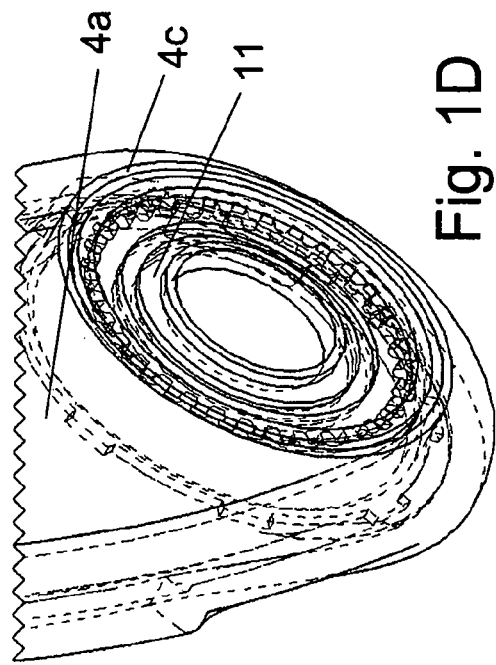
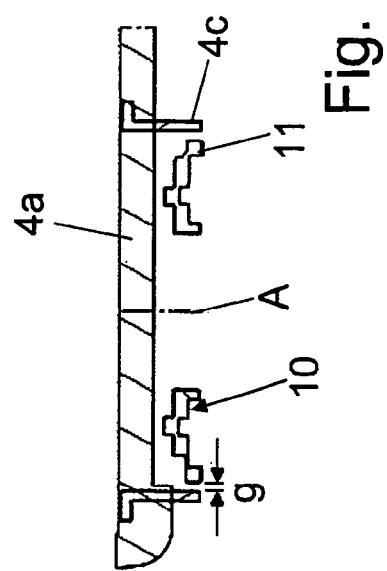
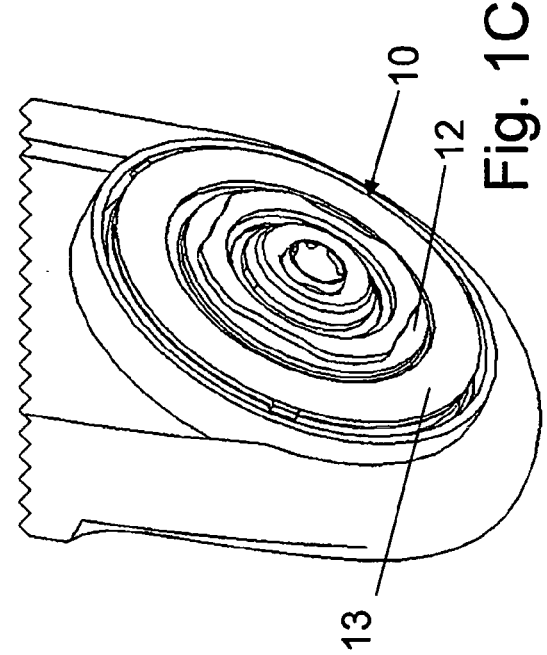

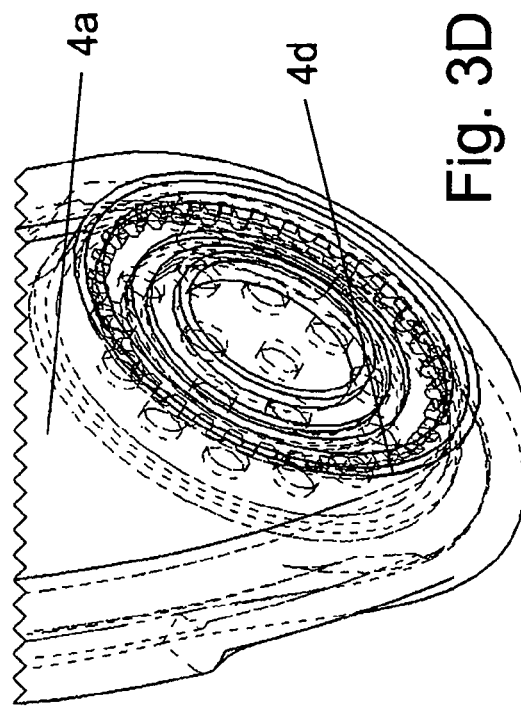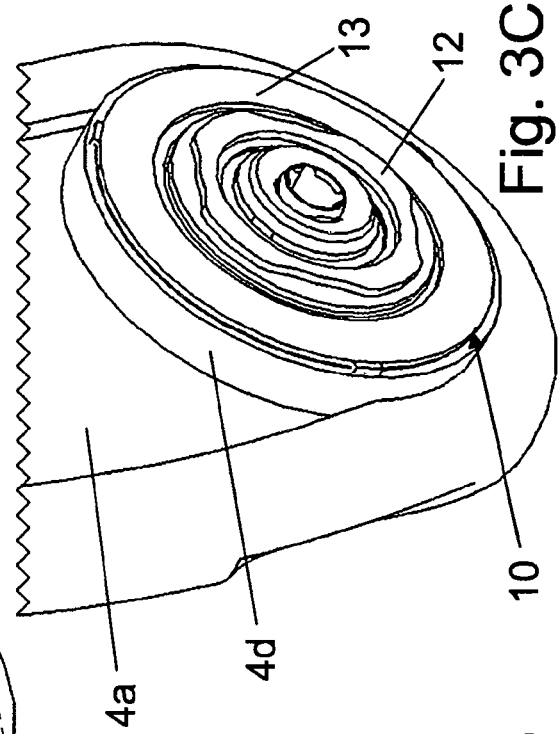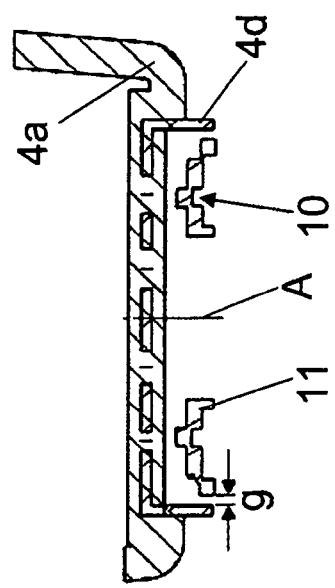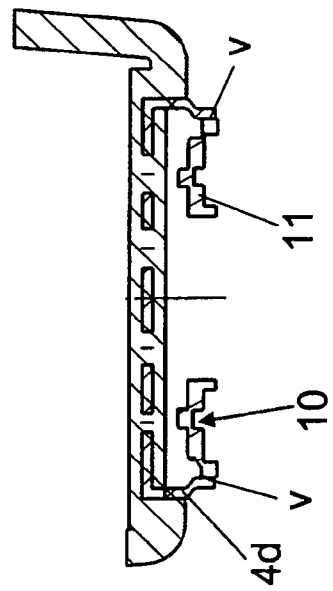

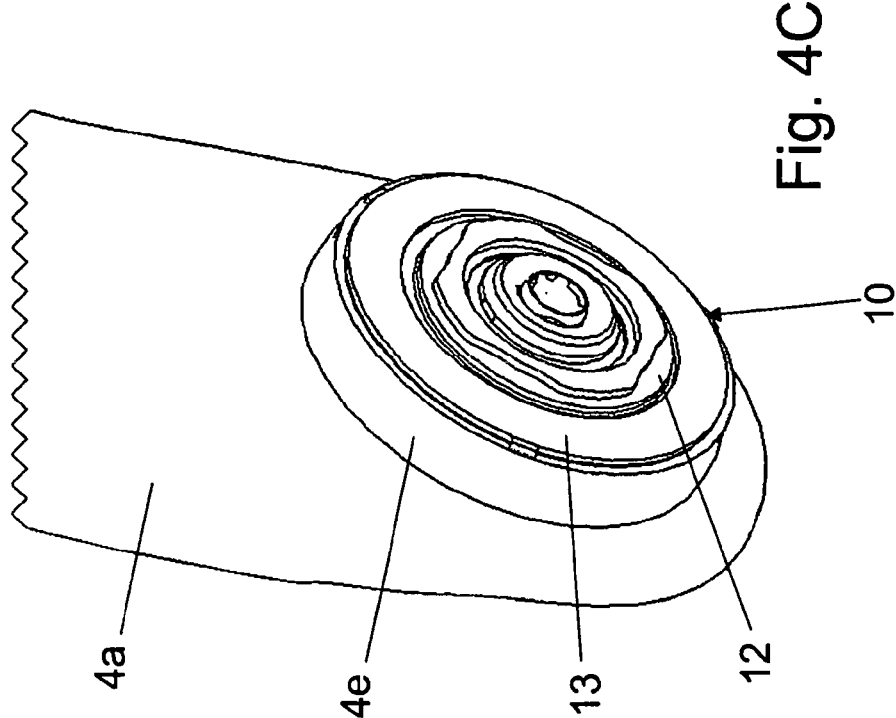
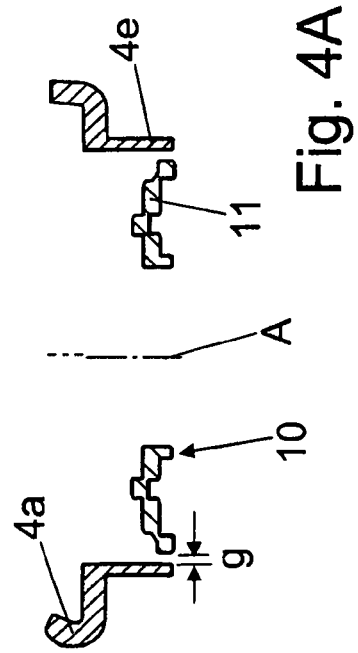
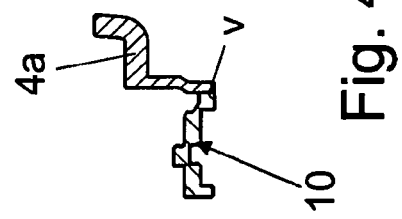
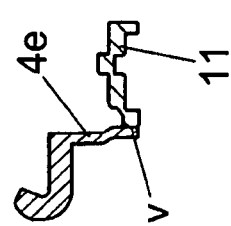

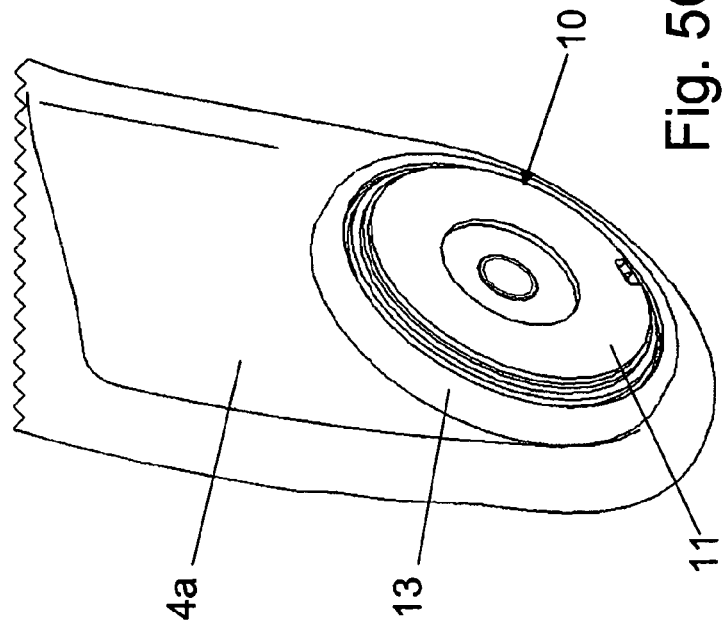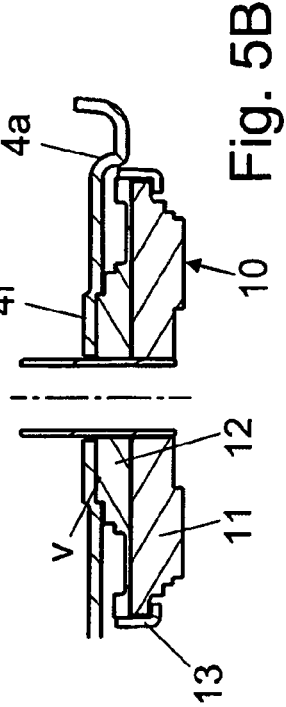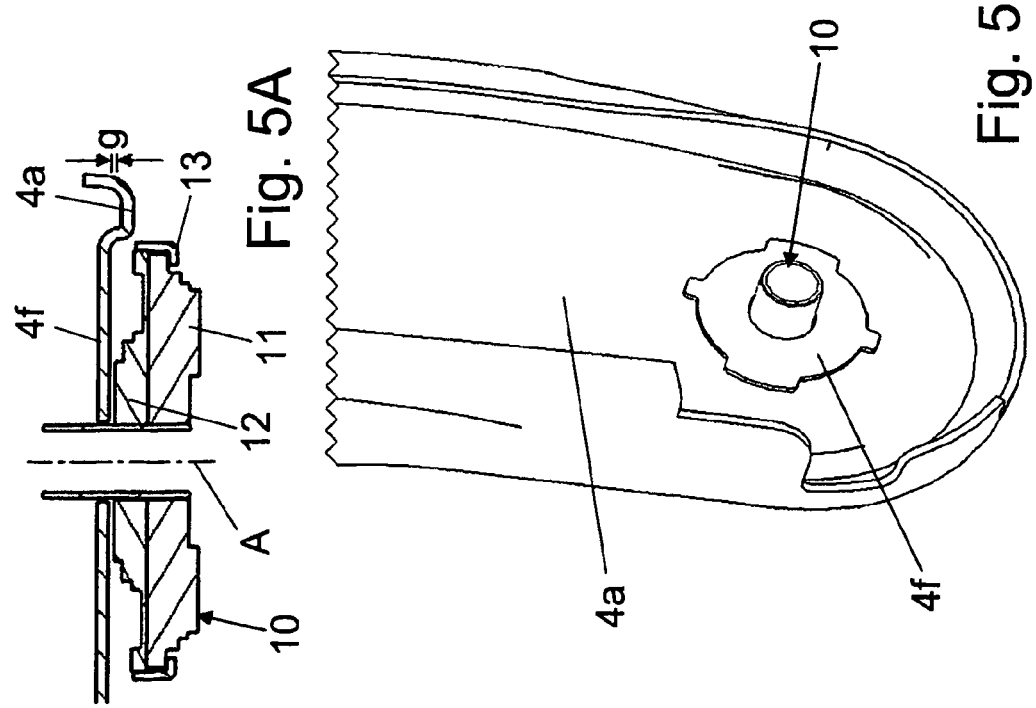

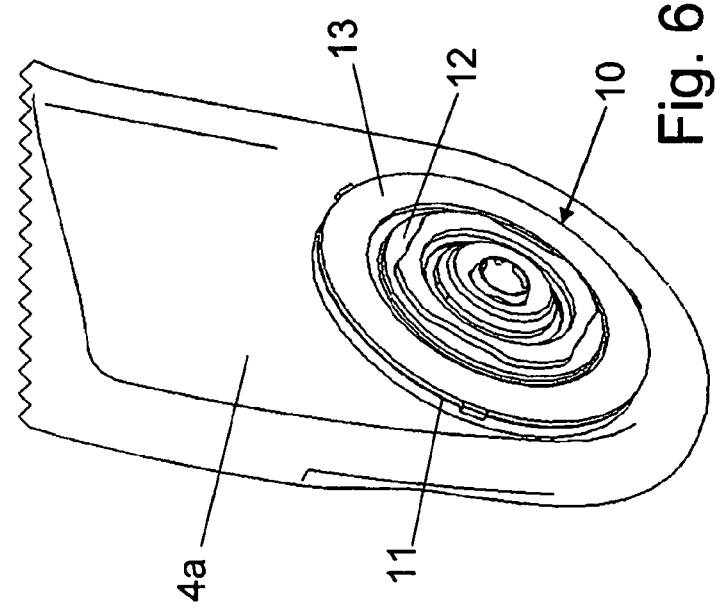
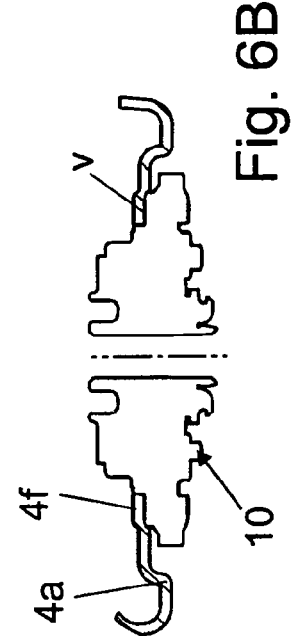
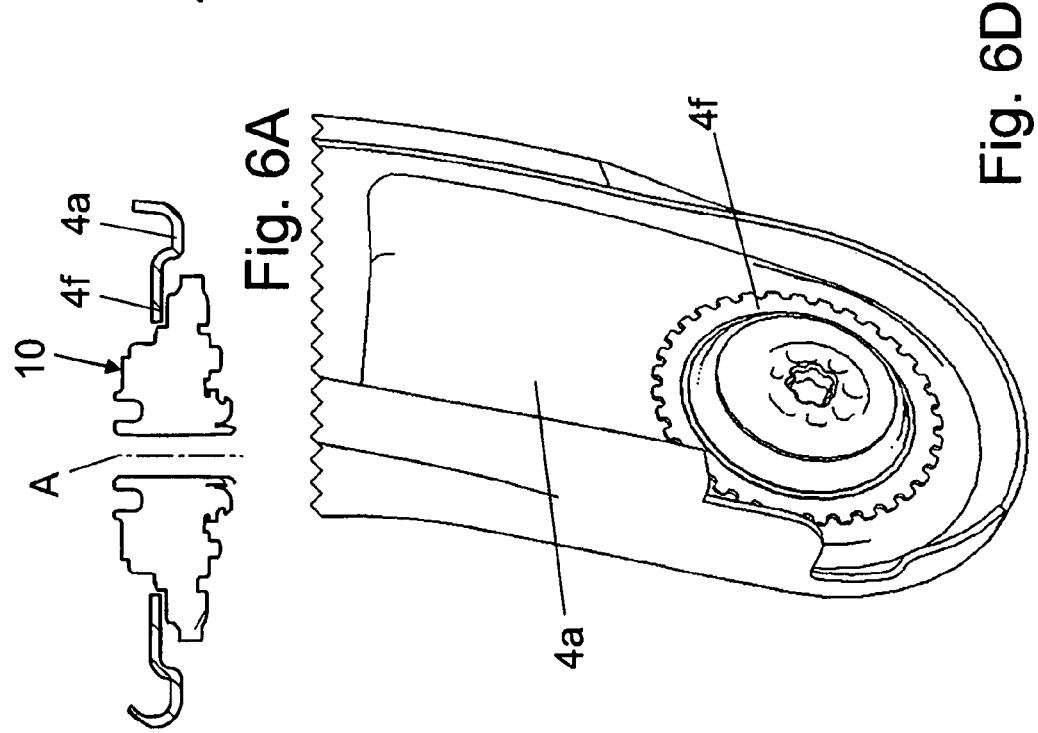
Fig. 6A
Fig. 6B
Fig. 6C
Fig. 6D

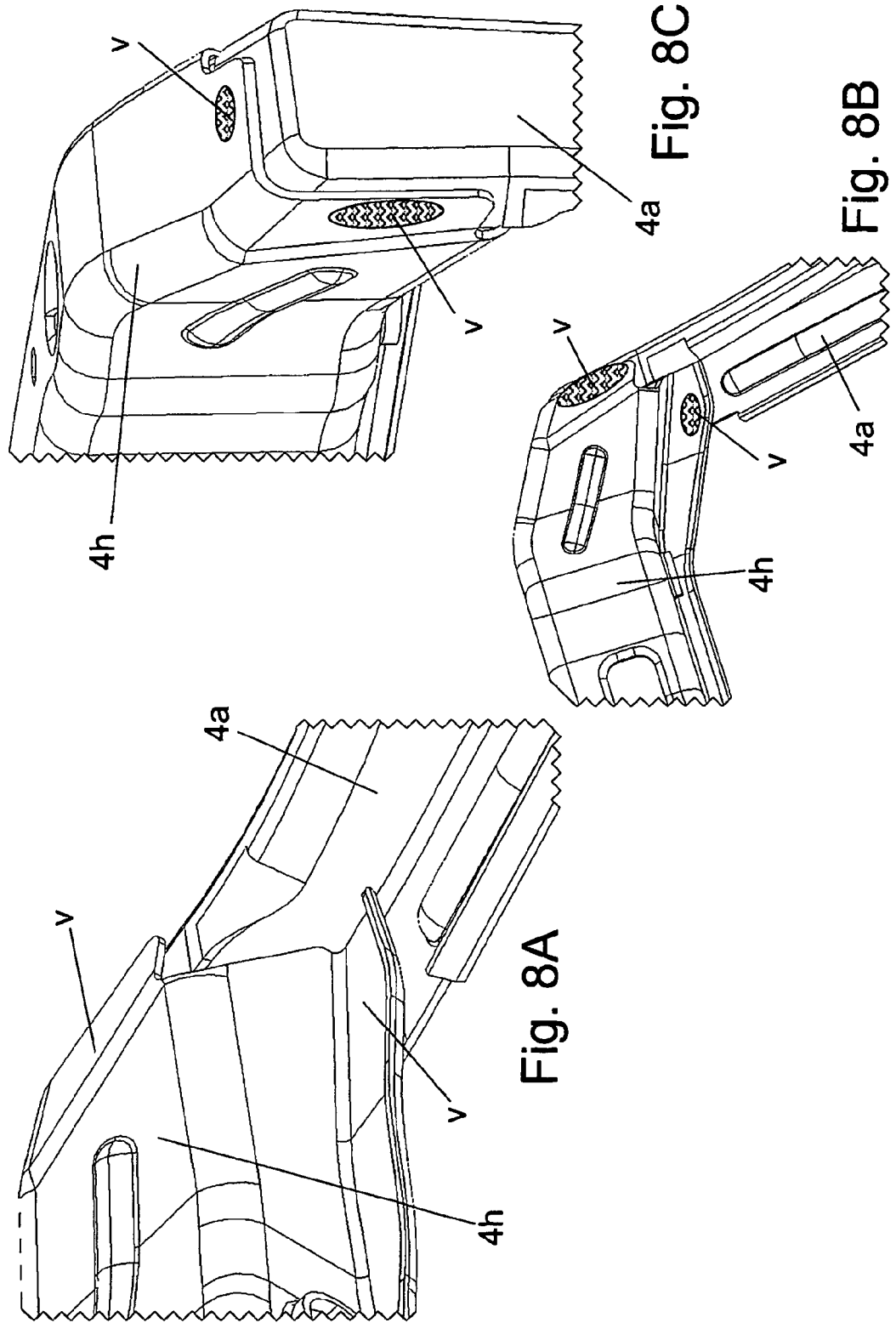

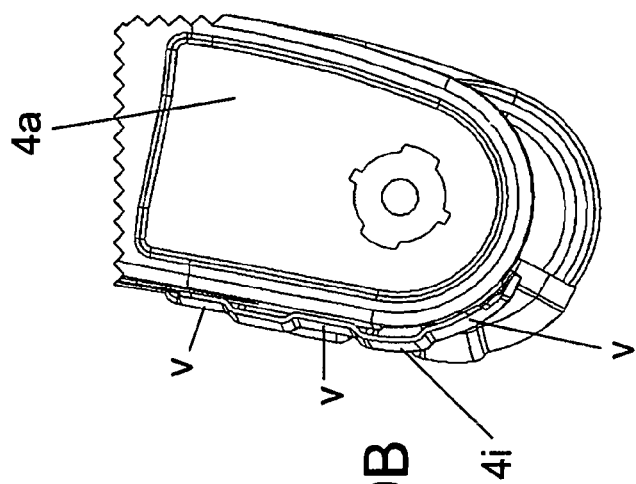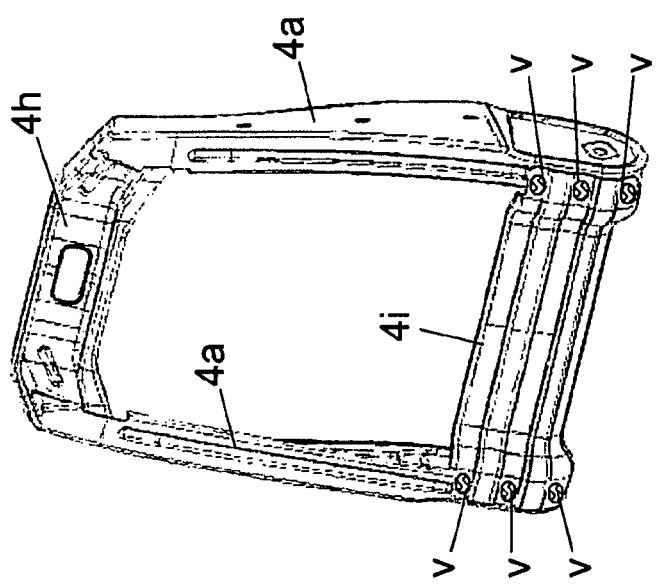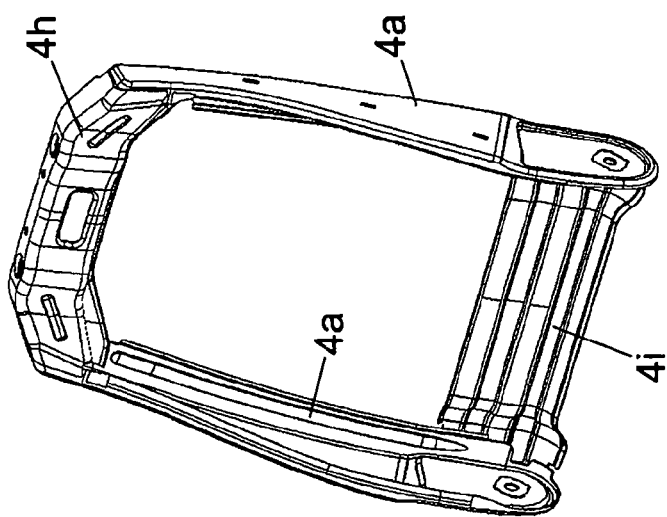

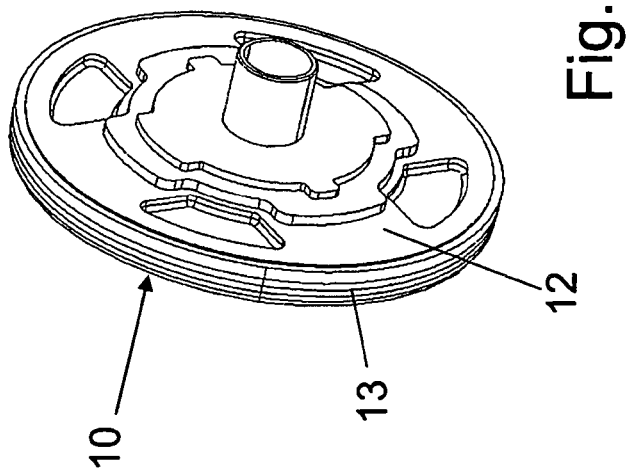
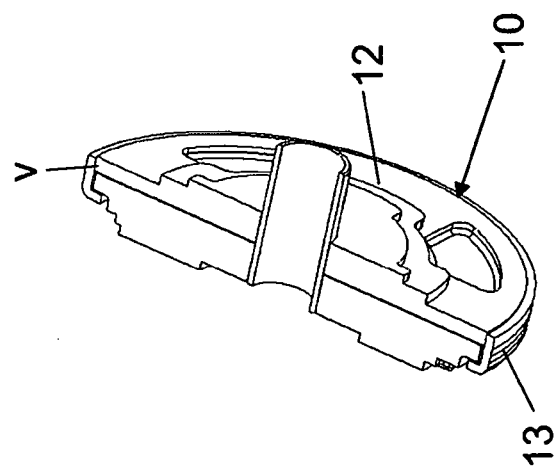
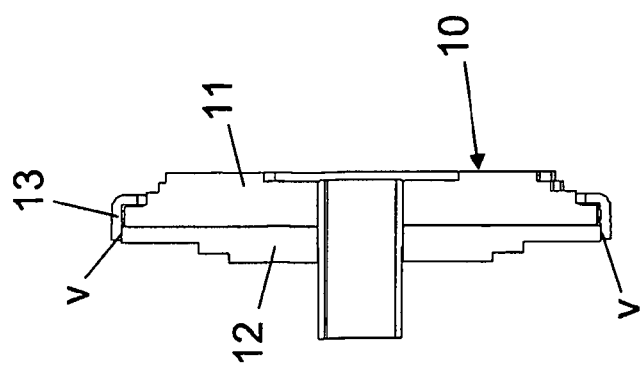

METHOD FOR CONNECTING TWO COMPONENTS OF A VEHICLE SEAT

CROSS REFERENCE TO RELATED APPLICATIONS

The present application is a National Stage of International Application No. PCT/EP2011/005932 filed on Nov. 25, 2011, which claims the benefit of German Patent Application No. 10 2010 056 378.1 filed on Dec. 20, 2010, the entire disclosures of which are incorporated herein by reference.

The invention relates to a method having the features of the preamble of claim 1 and to a vehicle seat which is produced by means of said method.

A known method of this type is welding, in which the components to be connected are melted locally and are connected to one another with a material-to-material fit by the solidifying melted mass. A distortion can be avoided if the melted region is at a minimum, such as in the case of laser welding. If, however, two different materials are to be connected to one another, for example aluminum and steel, special methods are necessary, for example ultrasonic welding, adhesive bonding, braze welding (cold metal transfer welding), clinching or crimping. However, said methods are either associated with high outlay to prepare the process or are limited in terms of the transmission of force. This requires high station times, possibly additional materials or connecting elements which add greatly to the production costs. Strength losses can be produced in the components in the regions under the influence of heat.

WO 2011/032691 A1 discloses the use of the electromagnetic pulse forming method in the vehicle seat field for the exclusive production of a positively locking connection or positively locking and nonpositive connection between two structural elements. Positively locking connections of this type without a material-to-material connection proportion tend, however, to undesired noise formation during long-term operation, in particular of the vehicle drives over a poor stretch of roadway.

The use of the electromagnetic pulse forming method to produce material-to-material connections of vehicle body parts is known from DE 696 34 343 T2 and U.S. Pat. No. 6,908,024 B2. However, the method cannot be transferred to vehicle seat components in an obvious way on account of different component geometries and material thicknesses. Furthermore, the vehicle body parts had an approximately equally great material thickness.

The invention is based on the object of improving a method of the type mentioned at the outset. According to the invention, this object is achieved by a method having the features of claim 1. Advantageous refinements are the subject matter of the subclaims.

The method which is used according to the invention has a plurality of advantages. Components made from different materials can be connected to one another. A loss of strength and a distortion are avoided because of the lack of a zone under the influence of heat. No additional connecting elements or additional materials are necessary. Exclusively a material-to-material connection (as in the case of welding) can be provided, or, in addition to the material-to-material connection, a positively locking connection or a nonpositive connection or any combination thereof. The strength of the connecting parts is higher than the basic strength of the weakest material, with the result that a high transmission of force can take place via the connecting point, with the simultaneous possibility to reduce weight and costs.

The two components to be connected are first of all arranged spaced apart from one another, more precisely with a gap of, for example, from 1 to 2 mm. The pulsed electromagnetic field accelerates one of the two components to be connected over a distance defined by the gap to a speed of over 200 m/s. When the accelerated component impacts with the stationary other component, the oxide layers which adhere to both surfaces are detached in the impact region and are blown laterally out of the gap by the air which is located between the components. The surfaces which are produced in this way are highly reactive and are under extreme contact pressure. This brings about the metallic bond, that is to say the material-to-material connection. A plurality of connecting points which are spaced apart from one another can be produced.

In order to fix to one another the components to be connected at the beginning of the method, the two components can bear against one another at some points by way of local, direct contact and only those part regions of the components which are first of all spaced apart from one another are pressed together.

The method is also suitable, in particular, for the component connection to at least one component which is composed predominantly of plastic and into which a metallic receiving element is embedded. On account of the low development of heat of the method, it is particularly suitable for connections of this type. Conventional welding methods would melt or destroy the plastic on account of the development of heat.

One of the components to be connected can be a fitting, as is known for setting the inclination of the backrest. There can be a single fitting (with two fitting parts which can be rotated relative to one another) on each vehicle seat side or a double fitting, as is described, for example, in DE 20 2010 015 143 U1, or a fitting which is present only on one vehicle seat side and is combined with a pivot on the other vehicle seat side. By way of the method, both individual fitting components, such as, in particular, a clasping ring, can be connected to one of the two fitting parts and the fitting itself can be connected to a seat structural component, in particular a backrest structural part.

The connection of a solid fitting part with component wall thicknesses of greater than 2 mm to a thin metal sheet of the backrest structural component with sheet metal thicknesses of less than 1 mm can be produced in a reliable process by way of the method according to the invention. In the case of conventional welding methods, there is the risk of perforation burning on account of the different material thicknesses and the resulting different dissipation of heat during the welding operation.

Vehicle seats having backrests which comprise two backrest structural parts, in the form of backrest side parts (backrest struts), which are connected to one another by an upper crossmember have a particularly high strength if the connection is carried out in accordance with the method according to the invention and the upper crossmember is configured approximately as a U-profile. For particularly highly loaded vehicle seats, an additional increase in strength can be achieved by a lower crossmember with a J-shaped profile which is preferably likewise fastened to the two backrest structural parts in accordance with the method according to the invention.

The use of the method has also proved particularly advantageous in the case of a rear seat backrest with a crossmember and a base plate which is to be connected to the former and can be composed of steel or of aluminum. The crossmember is preferably configured approximately as a U-profile with a middle limb and two outer limbs, which U-profile can be composed of steel or of aluminum or of magnesium and opens to the rear. In comparison with conventional connecting techniques, a great variability of the components to be connected is achieved with simultaneously high strength. The variability is interesting, in particular, for vehicle platforms which have a plurality of body variants. If the backrest is fastened to the parcel shelf of the vehicle body in the case of a notchback vehicle, a lightweight material can be selected for the structural components. In the case of body variants with a free-standing backrest, in particular estate vehicles, a material with greater strength is selected.

Figure 1F:
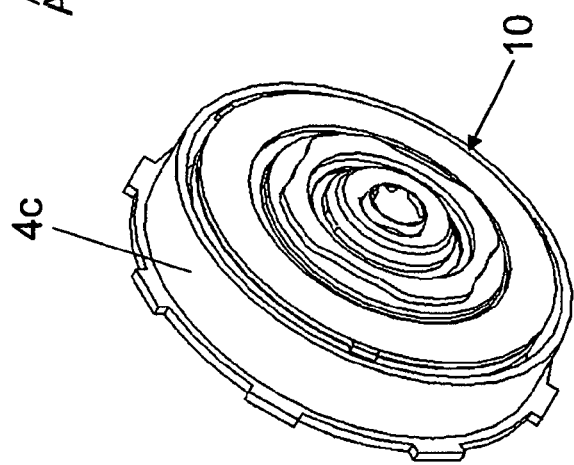
Figure 2:
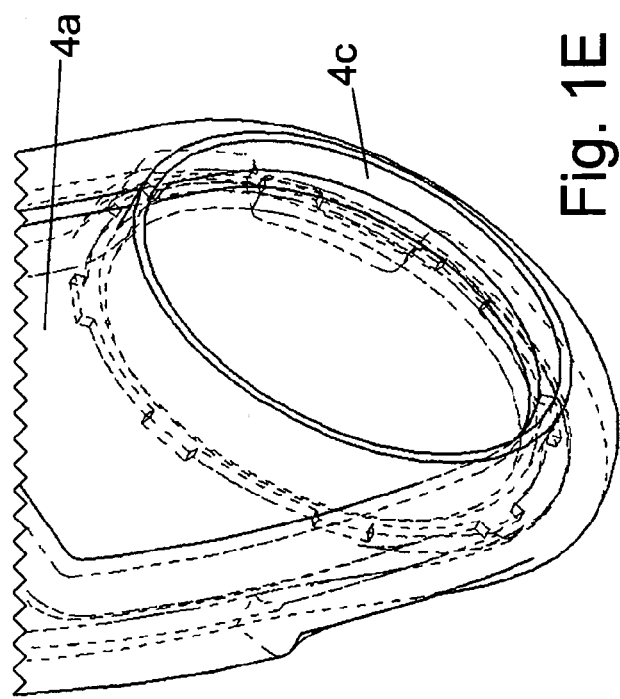
Figure 3F:
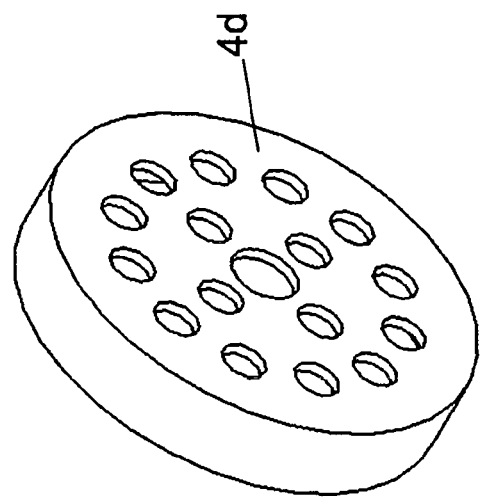
Figure 3E:
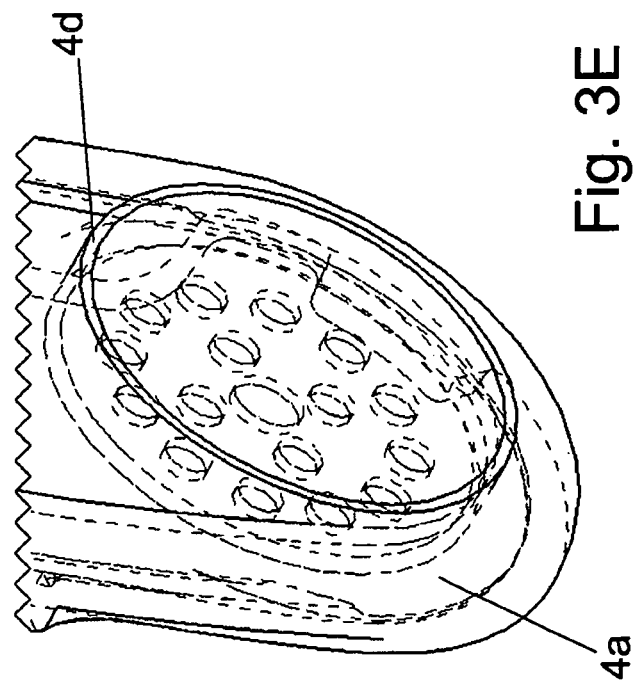
Figure 7B:
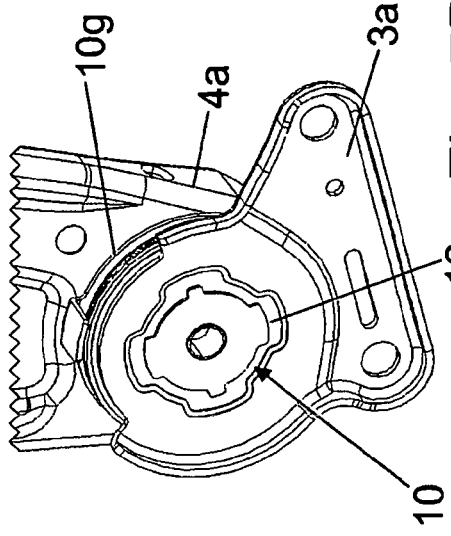
Figure 7A:
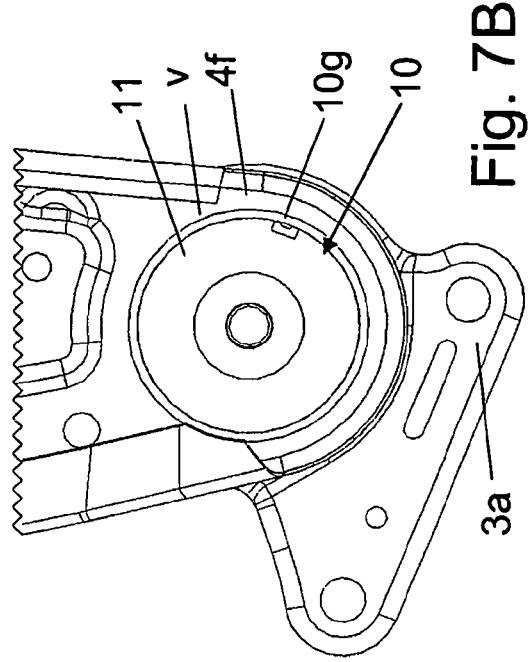
Figure 7D:
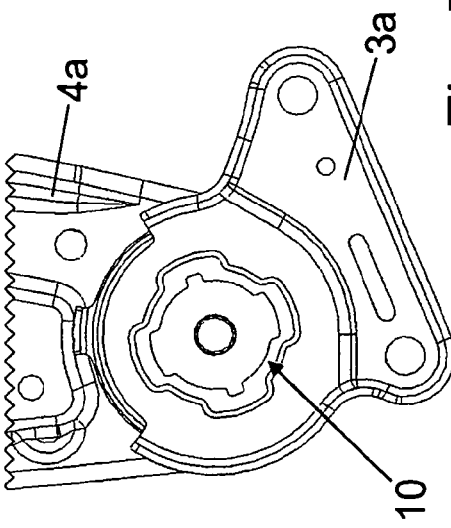
Figure 7C:
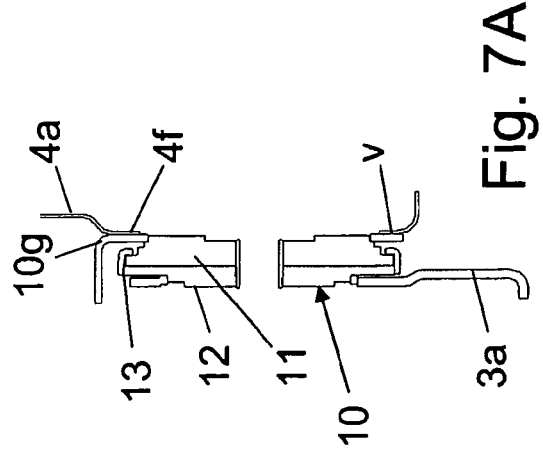
Figure 10C:
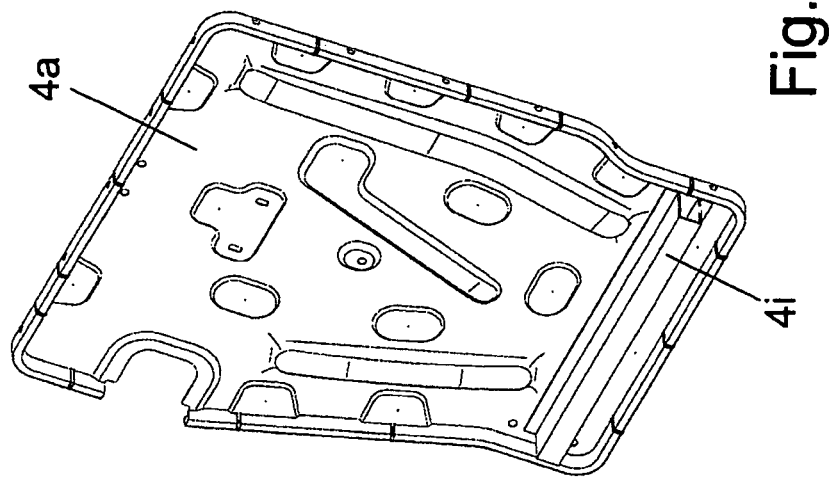
Figure 10A:
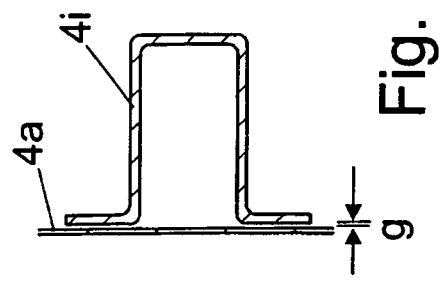
Figure 10B:
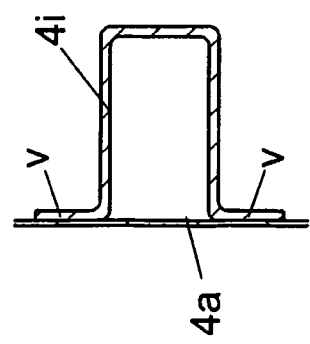

In the following text, the invention is explained in greater detail using a plurality of exemplary embodiments which are shown in the drawing with modifications. In the drawing:

FIG. 1A shows a section through the backrest structural part and the fitting in accordance with the first exemplary embodiment before the connecting, FIG. 1B shows a section through the backrest structural part and the fitting in accordance with the first exemplary embodiment after the connecting, FIG. 1C shows a perspective partial view of the backrest structural part with fitting in accordance with the first exemplary embodiment, FIG. 1D shows a perspective partial view of the backrest structural part with first fitting part in accordance with the first exemplary embodiment, FIG. 1E shows a perspective partial view of the backrest structural part without fitting in accordance with the first exemplary embodiment, FIG. 1F shows a perspective view of the crown with fitting in accordance with the first exemplary embodiment, FIG. 2 shows a diagrammatic illustration of a vehicle seat, FIG. 3A shows a section through the backrest structural part and the fitting in accordance with a modification of the first exemplary embodiment before the connecting, FIG. 3B shows a section through the backrest structural part and the fitting in accordance with the modification of the first exemplary embodiment after the connecting, FIG. 3C shows a perspective partial view of the backrest structural part with fitting in accordance with the modification of the first exemplary embodiment, FIG. 3D shows a perspective part view of the backrest structural part with first fitting part in accordance with the modification of the first exemplary embodiment, FIG. 3E shows a perspective partial view of the backrest structural part without fitting in accordance with the modification of the second exemplary embodiment, FIG. 3F shows a perspective rear view of the cup in accordance with the modification of the first exemplary embodiment, FIG. 4A shows a section through the backrest structural part and the fitting in accordance with the second exemplary embodiment before the connecting, FIG. 4B shows a section through the backrest structural part and the fitting in accordance with the second exemplary embodiment after the connecting, FIG. 4C shows a perspective partial view of the backrest structural part with fitting in accordance with the second exemplary embodiment, FIG. 5A shows a section through the backrest structural part and the fitting in accordance with the third exemplary embodiment before the connecting, FIG. 5B shows a section through the backrest structural part and the fitting in accordance with the third exemplary embodiment after the connecting, FIG. 5C shows a perspective partial view of the backrest structural part with fitting in accordance with the third exemplary embodiment, FIG. 5D shows a perspective partial view of the backrest structural part with fitting in accordance with the third exemplary embodiment from the opposite direction to FIG. 5C, FIG. 6A shows a section through the backrest structural part and the fitting in accordance with a modification of the third exemplary embodiment before the connecting, FIG. 6B shows a section through the backrest structural part and the fitting in accordance with the modification of the third exemplary embodiment after the connecting, FIG. 6C shows a perspective partial view of the backrest structural part with fitting in accordance with the modification of the third exemplary embodiment, FIG. 6D shows a perspective partial view of the backrest structural part with fitting in accordance with the modification of the third exemplary embodiment from the opposite direction to FIG. 5C, FIG. 7A shows a section through the backrest structural part with fitting in accordance with the fourth exemplary embodiment, FIG. 7B shows a side view of the backrest structural part with fitting in accordance with the fourth exemplary embodiment, FIG. 7C shows a side view of the backrest structural part with fitting in accordance with the fourth exemplary embodiment from the opposite direction to FIG. 7B, FIG. 7D shows a perspective partial view of the backrest structural part with fitting in accordance with the fourth exemplary embodiment, FIG. 8A shows a perspective partial view of the backrest structural part and of the upper crossmember in accordance with the fifth exemplary embodiment before the connecting, FIG. 8B shows a perspective partial view of the backrest structural part and of the upper crossmember in accordance with the fifth exemplary embodiment after the connecting, FIG. 8C shows a further perspective partial view of the backrest structural part and of the upper crossmember in accordance with the fifth exemplary embodiment after the connecting, FIG. 9A shows a perspective view of the backrest structural part and of the lower crossmember in accordance with the sixth exemplary embodiment, FIG. 9B shows a perspective view of the backrest structural part and of the lower crossmember in accordance with the sixth exemplary embodiment from the opposite direction to FIG. 9A, FIG. 9C shows a side view of the backrest structural part and of the lower crossmember in accordance with the sixth exemplary embodiment, FIG. 10A shows a section through the backrest structural part and the lower crossmember in accordance with the seventh exemplary embodiment before the connecting, FIG. 10B shows a section through the backrest structural part and the lower crossmember in accordance with the seventh exemplary embodiment after the connecting, FIG. 10C shows a perspective view of the backrest structural part with lower crossmember in accordance with the seventh exemplary embodiment, FIG. 11A shows a section through the fitting in accordance with the eighth exemplary embodiment, FIG. 11B shows a perspective section through the fitting in accordance with the eighth exemplary embodiment, and FIG. 11C shows a perspective view of the fitting in accordance with the eighth exemplary embodiment.

A vehicle seat 1 for a motor vehicle has a seat part 3 and a backrest 4 which can be pivoted about an axis A relative to the seat part 3. The axis A defines the directional indications of a cylindrical coordinate system which are used. Fittings 10 are provided on both sides for pivoting the backrest 4 and for attaching the latter to the seat part 3.

Each fitting 10 has a first fitting part 11 and a second fitting part 12 which can be rotated about the axis A relative to one another. The two fitting parts 11 and 12 can be inscribed in each case approximately into a circular disk shape. Both fitting parts 11 and are preferably composed of metal, in particular steel, which can be hardened at least in regions. A clasping ring 13 is provided for absorbing the axially acting forces, that is to say for holding the fitting parts 11 and 12 together axially. The clasping ring 13 is preferably composed of metal, in particular steel, which is preferably not hardened. The clasping ring 13 preferably has a substantially flat annular shape, but can also be profiled in an L-shaped manner in an alternative embodiment with a cylindrical section and a flat annular section on the end side.

The clasping ring 13 is connected fixedly to one of the two fitting parts 11 and 12, in the present case in an outer annular section to the second fitting part 12, for example by means of laser welding or by means of another fastening technique which is known per se. By means of an inner annular section which is arranged in a plane which is perpendicular with respect to the axial direction, the clasping ring 13 engages over the first fitting part 11 in its radially outer edge region, possibly with a sliding ring being positioned in between, without impeding the relative movement of the two fitting parts 11 and 12. In addition, those inner faces of the two fitting parts 11 and 12 which face one another are protected against the ingress of foreign bodies and against contamination and damage.

The clasping ring 13 and the fitting part 11 or 12 which is connected fixedly to it therefore clasp the other of the two fitting parts 11 and 12 which is movable relative to them. In a structural respect, the two fitting parts 11 and 12 therefore together form a disk-shaped unit (with the clasping ring 13). By way of the mounting of the fitting 10, one of the two fitting parts 11 or 12 is connected fixedly to the structure of the backrest 4, more precisely to a backrest structural part 4*a*, that is to say in a fixed manner with respect to the backrest. The other fitting part 11 or 12 is then connected fixedly to the structure of the seat part 3, more precisely a seat part adapter 3*a*, that is to say in a fixed manner with respect to the seat part. The fitting 10 lies in the force flow between backrest 4 and seat part 3.

The fitting 10 is configured as a latching fitting, in the case of which the first fitting part 11 and the second fitting part 12 can be locked with one another, as is described, for example, in DE 10 2006 015 560 B3, the disclosure of which in this regard is incorporated expressly. The (imaginary) axis A is then stationary with regard to the seat part 3. As an alternative, the fitting 10 is configured as a geared fitting, in the case of which the first fitting part 11 and the second fitting part 12 are connected to one another by means of a gear mechanism for adjusting and fixing, preferably by means of a self-locking eccentric epicyclic gear, as is described, for example, in DE 44 36 101 A1 or DE 20 2009 017 811 U1, the disclosure of which in this regard is incorporated expressly.

During the assembly of the vehicle seat 1, the electromagnetic pulse forming technique is used, inter alia, in the present case for joining metallic components, as is described, for example, in DE 696 34 343 T2 or DE 10 2009 019 320 A1. Here, the two components which are to be joined to one another are arranged spaced apart from one another. Coils are attached on the two components. The geometry of the components and their arrangement and the coil geometry have a great influence on the result of the joining operation. A short, powerful current pulse is generated by means of a capacitor discharge, which current pulse submits the two components to a highly dynamic electromagnetic field. The powerful magnetic attractive force presses together the components to be joined under high pressure, so that the result microscopically is a material-to-material connection. Any oxide layers on the metallic components are blasted off. The electromagnetic pulse forming technique therefore forms a material-to-material connection as in the case of welding, but without the metal being melted. This is of interest, in particular, for non-identical material pairings, such as steel/aluminum, steel/magnesium or steel/plastic, or non-identical material thicknesses. However, aluminum/aluminum or steel/steel material pairings are also possible.

Applications according to the invention of the electromagnetic pulse forming technique are provided in the region of the backrest 4.

In a first exemplary embodiment (FIG. 1A-FIG. 1F), the fitting 10 is connected (directly) to the backrest 4. The backrest structural part 4*a* is composed, for example, predominantly of plastic. A (metallic) receiving element (that is to say an element having a receptacle for the fitting 10), for example a crown 4*c*, is embedded into the backrest structural part 4*a*, for example injection molded, adhesively bonded, screwed, riveted or sewn in. The crown 4*c* is a cylindrical ring, from the one end side of which spikes protrude radially which ensure a positively locking connection in the plastic of the backrest structural part 4*a* and therefore the necessary retention of the crown 4*c*. The crown 4*c* is composed of metal, for example aluminum. On the other end side, the crown 4*c* protrudes axially out of the plastic material, which defines the free end of the crown 4*c*. The fitting 10 is positioned within the crown 4*c* of the backrest structural part 4*a* in such a way that a radial gap g is produced. A radially inwardly acting force is generated on the crown 4*c* by means of an electromagnetic pulse, which force deforms the crown 4*c* at the free end and shrinks it onto the fitting 10 with the formation of the material-to-material connection. The gap g disappears in the process. The fitting 10 which is intrinsically supported radially is not deformed.

In a modification of this (FIG. 3A-FIG. 3F), a cup 4*d* is provided as receiving element instead of the crown 4*c*, which cup 4*d* has a bottom and a hollow-cylindrical section. The cup 4*d* is molded with its perforated bottom into the plastic material of the backrest structural part 4*a*, the holes in the bottom ensuring a positively locking connection and therefore the necessary retention of the cup 4*d*. The hollow-cylindrical section of the cup 4*d* with the free end protrudes partially axially out of the plastic material. The fitting 10 is positioned within the cup 4*d* of the backrest structural part 4*a* in such a way that a radial gap g is produced. A radially inwardly acting force is generated on the cup 4*d* by means of an electromagnetic pulse, which force deforms the cup 4*d* at the free end and shrinks it onto the fitting 10 with the formation of the material-to-material connection. The gap g disappears at the connecting points v in the process. The fitting 10 which is intrinsically supported radially is not deformed.

In the second exemplary embodiment (FIG. 4A-FIG. 4C), the fitting 10 is likewise connected (directly) to the backrest 4. The backrest structural part 4*a* is composed, for example, of aluminum or magnesium. A receiving element, for example a collar 4*e*, (that is to say an element having a receptacle for the fitting 10) is molded onto the backrest structural part 4*a*, that is to say is configured integrally with the latter. The collar 4*e* is a cylindrical section of the backrest structural part 4*a*, which cylindrical section projects axially from a face of the backrest structural part 4*a*, which face runs at least approximately perpendicularly with respect to the axis A, which defines the free end of the collar 4e. The fitting 10 is positioned within the collar 4e of the backrest structural part 4a in such a way that a radial gap g is produced. A radially inwardly acting force is generated on the collar 4e by means of an electromagnetic pulse, which force deforms the collar 4e at the free end and shrinks it onto the fitting 10 with the formation of the material-to-material connection. The gap g disappears at the connecting points v in the process. The fitting 10 which is intrinsically supported radially is not deformed.

The fitting 10 is also connected (directly) to the backrest 4 in the third exemplary embodiment. The backrest structural part 4a is composed, for example, of aluminum or magnesium. A flat connecting ring 4f which runs at least approximately perpendicularly with respect to the axis A is configured on the backrest structural part 4a. The connecting ring 4f annularly encloses a passage opening, the diameter of which is smaller than the diameter of the fitting 10. The fitting 10 has end sides which are contoured, for example on account of shoulders for fastening or reverse sides of toothing systems. The fitting 10 is positioned with one of its contoured end sides on the connecting ring 4f of the backrest structural part 4a in such a way that an axial gap g is produced. A force which acts axially toward the fitting 10 is generated on the connecting ring 4f by means of an electromagnetic pulse, which force deforms the connecting ring 4f radially on the inside and shrinks it onto the contoured end side of the fitting 10 with the formation of the material-to-material connection and an additional positively locking connection. The gap g disappears at the connecting points v in the process. The fitting 10 which is intrinsically supported radially is not deformed. That side of the connecting ring 4f which faces away from the fitting 10 shows the contours of the fitting 10. The drawing shows this firstly using the second fitting part 12 of a latching fitting (FIG. 5A-FIG. 5D) and secondly in a modified embodiment using the first fitting part 11 of a geared fitting (FIG. 6A-FIG. 6D).

Finally, the fitting 10 is also connected to the backrest 4 in the fourth exemplary embodiment (FIG. 7A-FIG. 7D), but indirectly. The backrest structural part 4a is composed, for example, of aluminum or magnesium. A flat connecting ring 4f which runs at least approximately perpendicularly with respect to the axis A is configured on the backrest structural part 4a. The connecting ring 4f annularly encloses a passage opening, the diameter of which is smaller than the diameter of an adapter 10g which is fastened to the fitting 10. The adapter 10g of the fitting 10 serves, for example, to limit the relative rotation of the fitting parts 11 and 12 and is, for example, (laser) welded to the fitting 10. The adapter 10g preferably has an annular basic shape. The fitting 10 is fastened on the connecting ring 4f of the backrest structural part 4a by way of the adapter 10g in such a way that an axial gap is produced between the adapter 10g and the connecting ring 4f. A force which acts axially toward the fitting 10 is generated on the connecting ring 4f by means of an electromagnetic pulse, which force deforms the connecting ring 4f radially to the inside and presses it with the adapter 10g with the formation of the material-to-material connection. The axial gap disappears at the connecting points v in the process. The adapter 10g which is supported on the fitting 10 is not deformed substantially.

In the fifth exemplary embodiment (FIG. 8A-8C), parts of the structure of the backrest 4 are connected to one another. The backrest structural part 4a which is to be connected to the fitting 10 and preferably corresponds to that of the preceding exemplary embodiments is a backrest side part (backrest strut) which can be composed of steel or of aluminum. An upper crossmember 4h which can be composed of aluminum or magnesium is to be connected to said backrest structural part 4a. The backrest structural part 4a and the upper crossmember 4h are configured approximately as U-profiles with a central limb and two outer limbs, the limbs preferably in each case having an additional edge region. Here, the backrest structural part 4a opens to the inside and the upper crossmember 4h opens to the rear. The end of the upper crossmember 4h is positioned on the backrest side part 4a in such a way that the upper outer limb of the upper crossmember 4h is arranged on the edge region of the central limb of the backrest structural part 4a, at least in part regions with a gap in between, that the central limb of the upper crossmember 4h is arranged on the front outer limb of the backrest structural part 4a, at least in part regions with a gap in between, and that the edge region of the lower outer limb of the upper crossmember 4h is arranged on the rear outer limb of the backrest structural part 4a, at least in part regions with a gap in between. A force which acts locally between the backrest structural part 4a and the upper crossmember 4h is generated in the three stated overlapping regions by means of in each case one electromagnetic pulse, which force deforms the corresponding regions in pairs and presses them with one another with the formation of the material-to-material connection, with the result that three connecting points v are produced. The gaps which are provided at least in part regions disappear at the connecting points v in the process.

In the sixth exemplary embodiment (FIG. 9A-FIG. 9C), parts of the structure of the backrest 4 are likewise connected to one another. The backrest structural part 4a which is to be connected to the fitting 10 and preferably corresponds to that of the preceding exemplary embodiments is a backrest side part (backrest strut) which can be composed of steel or of aluminum. A lower crossmember 4i which can be composed of aluminum or magnesium is to be connected to said backrest structural part 4a. The backrest structural part 4a is configured approximately as a U-profile with a central limb and two outer limbs and opens to the inside. The lower crossmember 4i is profiled approximately with a J-shape and is provided with parallel beads. Each end of the lower crossmember 4i is positioned on the backrest structural part 4a in such a way that the lower crossmember 4i is arranged on the rear outer limb of the backrest structural part 4a, with a gap in between. A force which acts locally between the backrest structural part 4a and the lower crossmember 4i is generated in three part regions of said overlapping region which are spaced apart from one another by means of in each case one electromagnetic pulse, which force deforms the corresponding part regions in pairs and (more or less at the same time) presses them with one another with the formation of the material-to-material connection, with the result that three connecting points v are produced. The gap disappears at the connecting points v in the process.

In the seventh exemplary embodiment (FIG. 10A-FIG. 10C), in the case of the backrest 4 of a rear seat, a backrest structural part 4a is connected to a (lower) crossmember 4i which, for example on the end side, receives a pivot which replaces the fitting 10. The backrest structural part 4a to be connected to the crossmember 4i is a base plate which can be composed of steel or of aluminum. The crossmember 4i is configured approximately as a U-profile with a central limb and two outer limbs, which U-profile can be composed of steel or of aluminum or of magnesium and opens to the rear. The crossmember 4i is positioned with its outer limbs on the backrest structural part 4a, with a gap g in between. A force which acts locally between the backrest structural part 4a and the crossmember 4i is generated in a plurality of regions, which are spaced apart from one another, of the outer limbs by means of in each case one electromagnetic pulse, which force deforms the corresponding regions in pairs and presses them with one another with the formation of the material-to-material connection, with the result that a plurality of connecting points v are produced. The gap g disappears at the connecting points v in the process.

In the eighth exemplary embodiment (FIG. 11A-FIG. 11C), in the case of a fitting 10, the clasping ring 13 is connected to one of the two fitting parts 11 or 12, the second fitting part 12 in the present case. The clasping ring 13 is profiled in an L-shaped manner with a cylindrical and an annular section. The two fitting parts 11 and 12 and the components which are arranged in between form one assembly which can be pre-assembled ("provisionally") by way of a central driver and a securing ring. The assembly is positioned within the cylindrical section of the clasping ring 13 in such a way that a radial gap is produced. A radially inwardly acting force is generated on the clasping ring 13 by means of an electromagnetic pulse, which force deforms the clasping ring 13 in the cylindrical section and shrinks it onto the second fitting part 12 with the formation of the material-to-material connection. The gap disappears at the connecting points v in the process. Said assembly, which is intrinsically supported radially, of the fitting 10 which is produced is not deformed, or at least not substantially.

In modifications of all the exemplary embodiments, the two components are arranged spaced apart from one another only in part regions. However, the fixing of the arrangement of the two components relative to one another is effected in locations by local, direct contact between the components. Thus, for example, a first metal sheet can be provided with beads in its contact face with a second metal sheet, which beads are configured so as to be oriented away from the contact face. The first and the second metal sheets preferably already bear against one another flatly at the beginning of the method. The two metal sheets are necessarily arranged spaced apart from one another only in the region of the beads of the first metal sheet. In the further course of the method, according to the invention, the beads of the first metal sheet are then deformed with the production of a material-to-material connection, are pressed against the second metal sheet and the material-to-material connection is produced.

LIST OF DESIGNATIONS

1 Vehicle seat
3 Seat part
3a Seat part adapter
Backrest
4a Backrest structural part
4c Crown
4d Cup
4e Collar
4f Connecting ring
4h Upper crossmember
4i Lower crossmember
10 Fitting
10g Adapter
11 First fitting part
12 Second fitting part
13 Clasping ring
A Axis
g Gap
v Connecting point

The invention claimed is:

1. A method for connecting two at least partially metallic components of a vehicle seat which has a backrest which can be pivoted about an axis, the two components being arranged relative to one another and then being connected, comprising:
arranging the two components spaced apart from one another at least in part regions; and
connecting the two components by electromagnetic pulse technology, wherein electromagnetic fields are induced by a current pulse in the two components, the strong magnetic attraction force of which electromagnetic fields pressing the two components together with the formation of a material-to-material connection,
wherein the material-to-material connection transmits forces in at least two directions, and
wherein, in order to fix the arrangement of the two components with respect to one another, the two components bear against one another at some points by way of local, direct contact and only the part regions of the components which are initially spaced apart from one another are pressed together.

2. The method as claimed in claim 1, wherein a combination of material-to-material connection and positively locking connection is produced.

3. The method as claimed in claim 1, wherein the two components are initially arranged completely spaced apart from one another.

4. The method as claimed in claim 1, wherein one of the two components is produced from steel and the other of the two components is produced from aluminum or magnesium.

5. The method as claimed in claim 1 wherein one of the two components is produced predominantly from plastic, with a metallic receiving element being embedded.

6. The method as claimed in claim 1 wherein the two components are arranged spaced apart from one another by way of a radial or axial gap with regard to the axis.

7. The method as claimed in claim 1 wherein the two components are a backrest structural part and a fitting and/or two parts of the structure of the backrest and/or two parts of a fitting.

8. The method as claimed in claim 7, wherein the backrest structural part has a receiving element with a cylindrical section which is arranged with a radial gap from the fitting which is configured as a disk-shaped unit, and is shrunk onto the fitting.

9. The method as claimed in claim 7, wherein the backrest structural part has a flat connecting ring which is arranged on the fitting with an axial gap and is connected to the contoured end side of the fitting with the formation of an additional positively locking connection.

10. The method as claimed in claim 7, wherein the two parts of the structure of the backrest are connected to one another at a plurality of connecting points which are spaced apart from one another.

11. The method as claimed in claim 1 wherein one of the two components is intrinsically supported and is at least substantially not deformed during the connection to the other of the two components.

12. A vehicle seat having at least two components which are connected to one another by the method as claimed in claim 1, the two components being metallic at least at the connecting points.

13. The vehicle seat as claimed in claim 12, wherein the backrest structural part which is connected to the fitting is connected to an upper crossmember, and the backrest structural part and the upper crossmember are configured approximately as U-profiles.

14. The vehicle seat as claimed in claim 13, wherein the backrest structural part is connected to a lower crossmember which is profiled approximately in a J-shape and is provided with parallel beads.

* * * * *